Oct. 15, 1968 H. C. VYKUKAL 3,405,406
HARD SPACE SUIT
Filed July 19, 1966 6 Sheets-Sheet 1

INVENTOR.
HUBERT C. VYKUKAL
BY
ATTORNEYS

Oct. 15, 1968 H. C. VYKUKAL 3,405,406

HARD SPACE SUIT

Filed July 19, 1966 6 Sheets-Sheet 2

INVENTOR.
HUBERT C. VYKUKAL

BY
ATTORNEYS

HARD SPACE SUIT

Filed July 19, 1966 6 Sheets-Sheet 3

INVENTOR.
HUBERT C. VYKUKAL

BY
ATTORNEYS

INVENTOR.
HUBERT C. VYKUKAL
BY
ATTORNEYS

HARD SPACE SUIT

Filed July 19, 1966 6 Sheets-Sheet 5

INVENTOR.
HUBERT C. VYKUKAL

BY [signature]
ATTORNEYS

Oct. 15, 1968 H. C. VYKUKAL 3,405,406

HARD SPACE SUIT

Filed July 19, 1966 6 Sheets-Sheet 6

INVENTOR.
HUBERT C. VYKUKAL

BY

ATTORNEYS

United States Patent Office 3,405,406

Patented Oct. 15, 1968

3,405,406
HARD SPACE SUIT

Hubert C. Vykukal, Sunnyvale, Calif., assignor to the United States of America as represented by the Administrator of the National Aeronautics and Space Administration Filed July 19, 1966, Ser. No. 566,397
16 Claims. (Cl. 2—2.1)

ABSTRACT OF THE DISCLOSURE

A space suit of rigid material providing the wearer with extreme mobility and protection from the environment. The suit comprises an upper body covering portion made of rigid material, a pelvic covering portion of rigid material, arm covering portions of rigid material, and leg covering portions of rigid material. The pelvic covering portion is connected to the upper body portion by generally circular metal waist bellows. Each of the leg covering portions is connected to the pelvic portion by means of circular metal thigh bellows. Each of the arm and leg portions is articulated by means of specially arranged circular bearings. Each arm covering portion is coupled to the upper body covering portion by means of two inclined circular bearings. Life support fluids pass through the covering portions.

The invention described herein was made by an employee of the United States Government and may be manufactured and used by or for the Government for governmental purposes without the payment of any royalties thereon or therefor.

This invention relates to suits to be worn in environmental conditions which are different from normal atmospheric conditions. In particular the invention relates to suits which will protect the wearer against the environmental conditions encountered in space, and more specifically to a suit made of hard non-flexible material.

There are numerous problems associated with providing a suit for use under the conditions encountered in space travel. For example, a space suit must be pressurized on the inside in order to protect the wearer from the vacuum which exists on the outside of the suit. In addition the suit must be capable of protecting the wearer against the extreme ranges of heat and cold encountered in space. The suit must also protect the wearer against meteorite penetration and radiation. The suit must be capable of providing mobility for the wearer with a minimum of forces acting in resistance to the desired movements. In addition, the suit must be usable over extended periods of time with substantially no deterioration in its desirable features.

In the past the conventional approach to space suit design has involved the use of fabric materials. However, fabric suits have not been completely successful in providing the desirable features mentioned in the preceding paragraph. More specifically the leakage of pressurizing gas through the fabric itself is appreciable. Fabric does not provide adequate protection against thermal extremes, physical punctures or radiation. When a flexible suit is inflated it becomes very difficult for the wearer to flex it and make the desired movements. When a fabric or other soft type material is made into a suit and internally pressurized it presents substantial resistance to bending and torsion, and the resistance does not disappear after the movement has been made because the pressurized soft material has a continuous restoring force tending to return it to its original configuration.

It is an object of the present invention to provide an environmental suit which will incorporate improved solutions to various problems previously mentioned.

More specifically an object of the present invention is to provide an environmental suit which has very low leakage when pressurized to the desired internal pressure, and in which the mobility of the suit is not a function of the internal pressure. The present fabric type space suits operate at about 3.7 p.s.i. internal pressure. This is approximately the partial pressure of oxygen in the earth's atmosprere. Consequently, only one gas, oxygen, can be used in the suit. This eliminates the capability of utilizing the advantages of a multi-gas mixture in the life-support system. The reason that higher internal pressures are not employed is that soft suit mobility and leakage are a direct function of suit pressure. At a desirable pressure of 7.5 or 10 p.s.i., the astronaut in a conventional fabric suit would be essentially immobile, and the amount of gas leakage would be beyond tolerable limits. In contrast to a fabric suit, a suit made according to the invention is constructed of hard material which is impervious to gas, and the bearings which provide the articulation are sealed in a manner which results in substantially less leakage than with a fabric suit. In addition, the nature of the hard suit construction is such that the pressure inside the suit can be increased to the desired value without reducing the mobility of the suit.

An additional object of the invention is to provide protection against extreme ranges of heat and cold and against meteorite penetration and radiation. The types of suit construction which can be achieved with hard materials are particularly adapted to accomplish the stated objects, as will be hereinafter described in more detail.

A further object of the invention is to provide an environmental suit which affords the wearer substantially complete mobility with a minimum of forces acting in resistance to the desired movement. In particular, the object of the invention is to provide an environmental suit having an improved articulation construction at the shoulders, elbows, waist, hips and knees. The low-resistance, high-mobility articulation is provided in accordance with the present invention by means of special arrangements of rotary bearings and flexible bellows.

An additional object of the invention is to provide an environmental suit which is usable over extended periods of time with substantially no deterioration. For example, in a hard suit constructed according to the invention, the leakage is substantially unaffected by use, whereas conventional fabric suits undergo an increase in leakage of fifty to one hundred percent over a relatively short period of use.

Another object of the invention is to provide an environmental suit which is relatively light in weight.

Another object of the invention is to provide an improved articulated joint structure which can be beneficially employed in soft space suits and a variety of other situations.

An additional object of the invention is to provide a bearing and seal arrangement for space suits wherein the seals present high resistance to leakage with relatively low resistance to movement and also prevent bearing seizure by preventing exposure of the bearing materials to external vacuum environments.

By way of brief description an environmental suit made in accordance with the invention comprises an upper body covering portion made of rigid material, a pelvic covering portion of rigid material, arm covering portions of rigid material, and leg covering portions of rigid material. The pelvic covering portion is connected to the upper body portion by a generally circular metal waist bellows. Each of the leg covering portions is connected to the pelvic portion by means of circular metal thigh bellows. Each of the arm and leg portions is articulated by means of specially arranged circular bearings, and the bearings are sealed to prevent gas leakage and exposure of the bearings to vacuum conditions.

The various features and objects of the invention will become more apparent from the following detailed description wherein reference is made to the accompanying drawings in which.

Figures 1, 2:
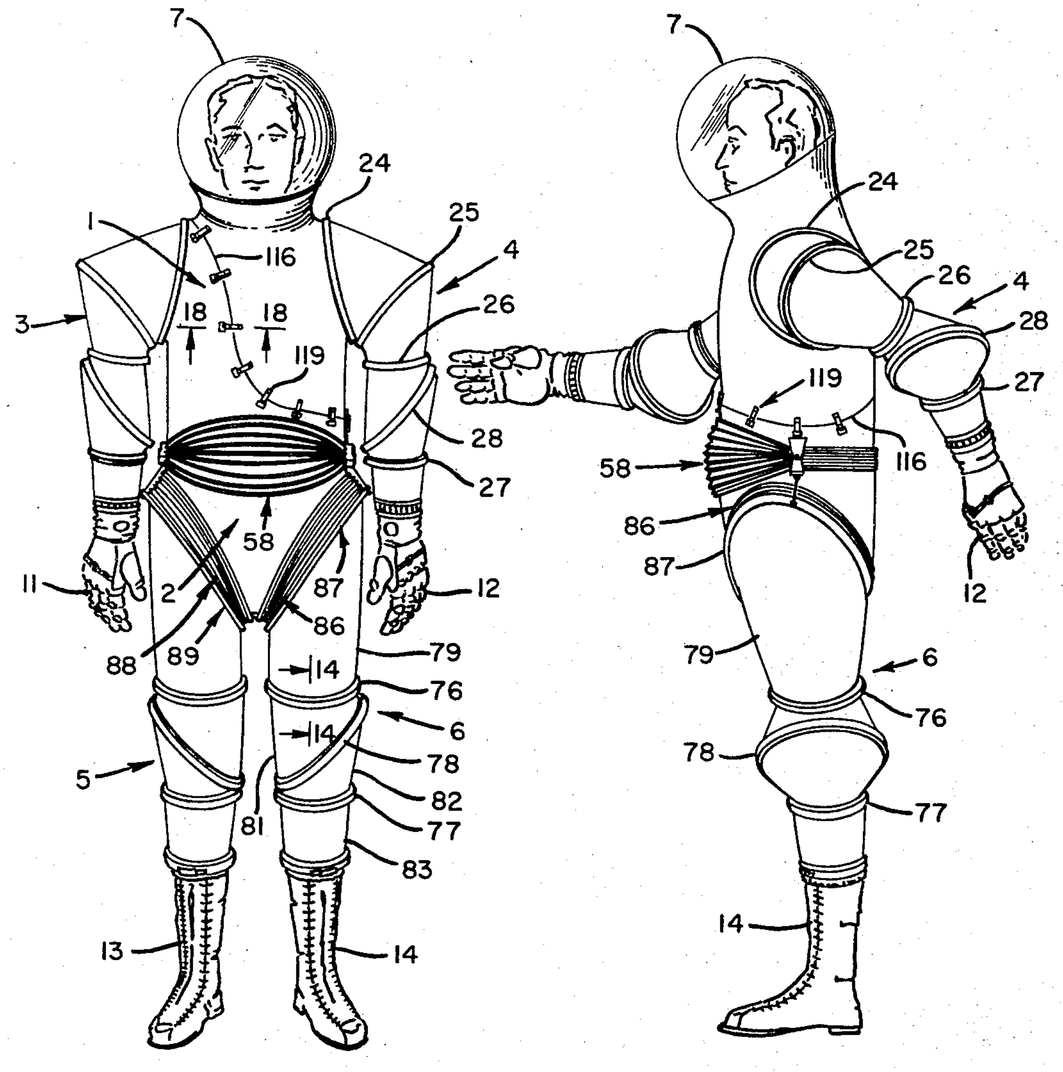
FIGURE 1 is a front elevational view of an environmental suit made in accordance with the invention.
FIGURE 2 is a side elevational view of the suit of FIGURE 1 but showing the arms in a different position than in FIGURE 1.
Figure 6:
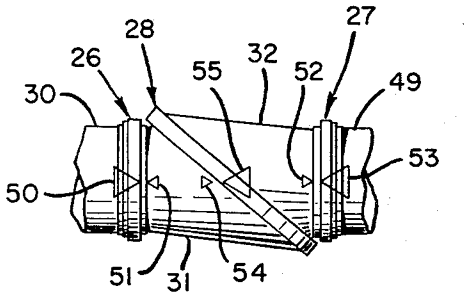
Figure 8:
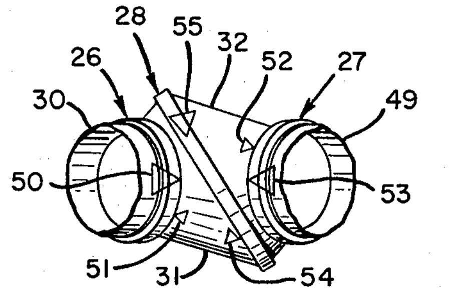
Figure 7:
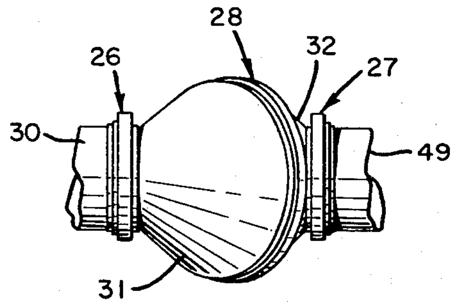
Figure 9:
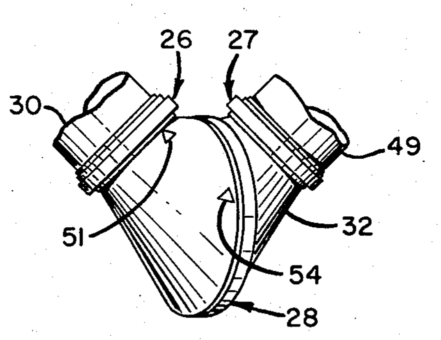
Figure 10:
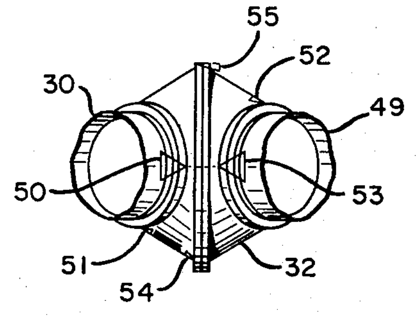
Figure 11:
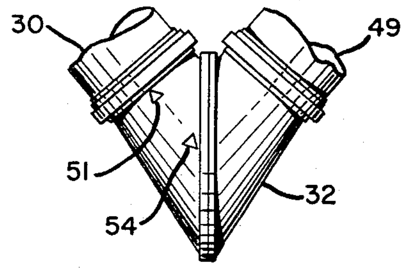
Figure 12:
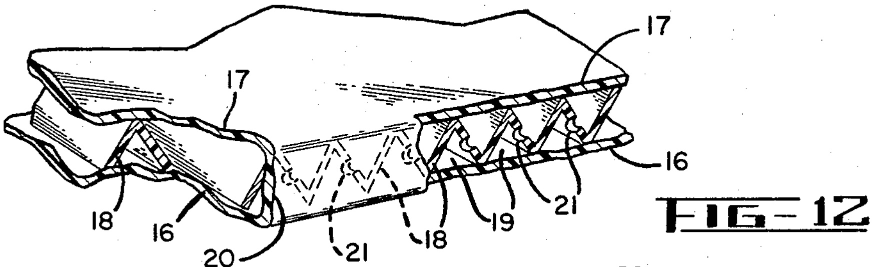
Figure 13:
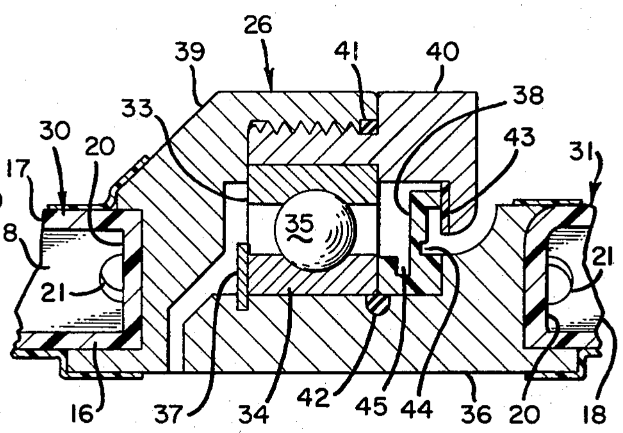
Figure 14:
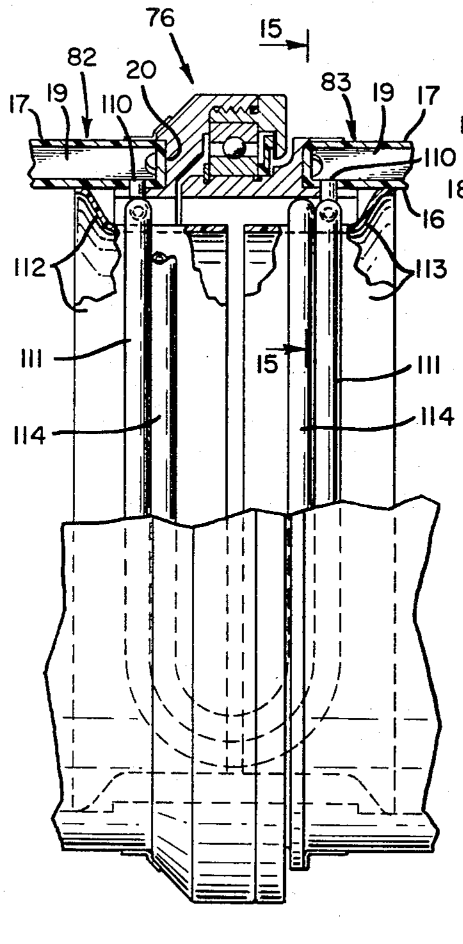
Figure 15:
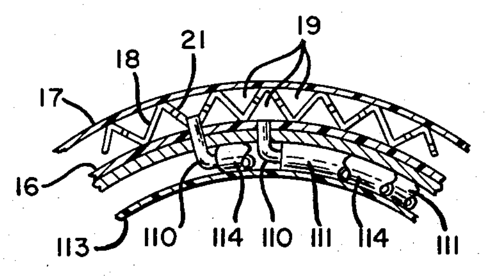
Figure 16:
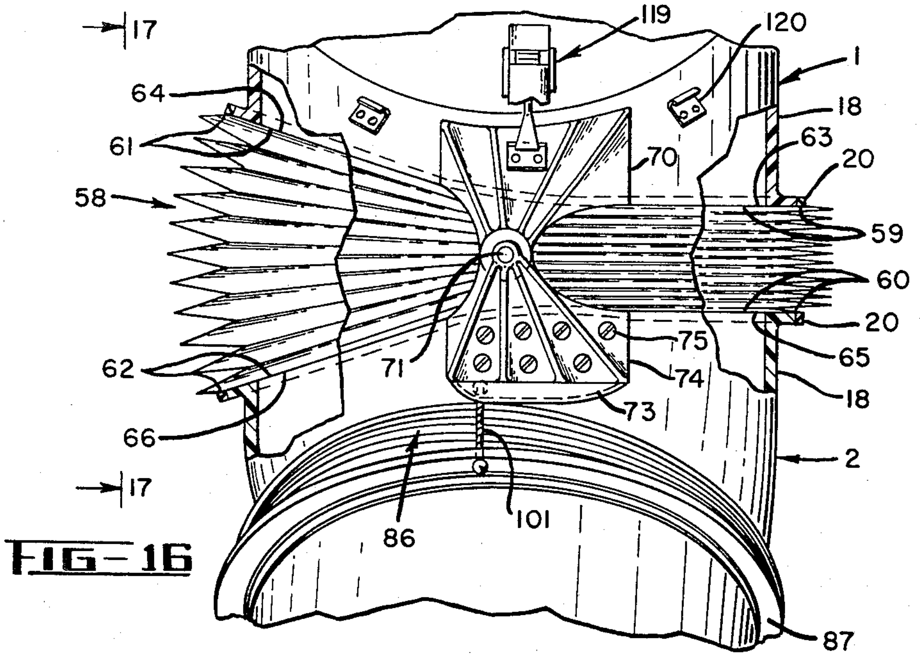
Figure 17:
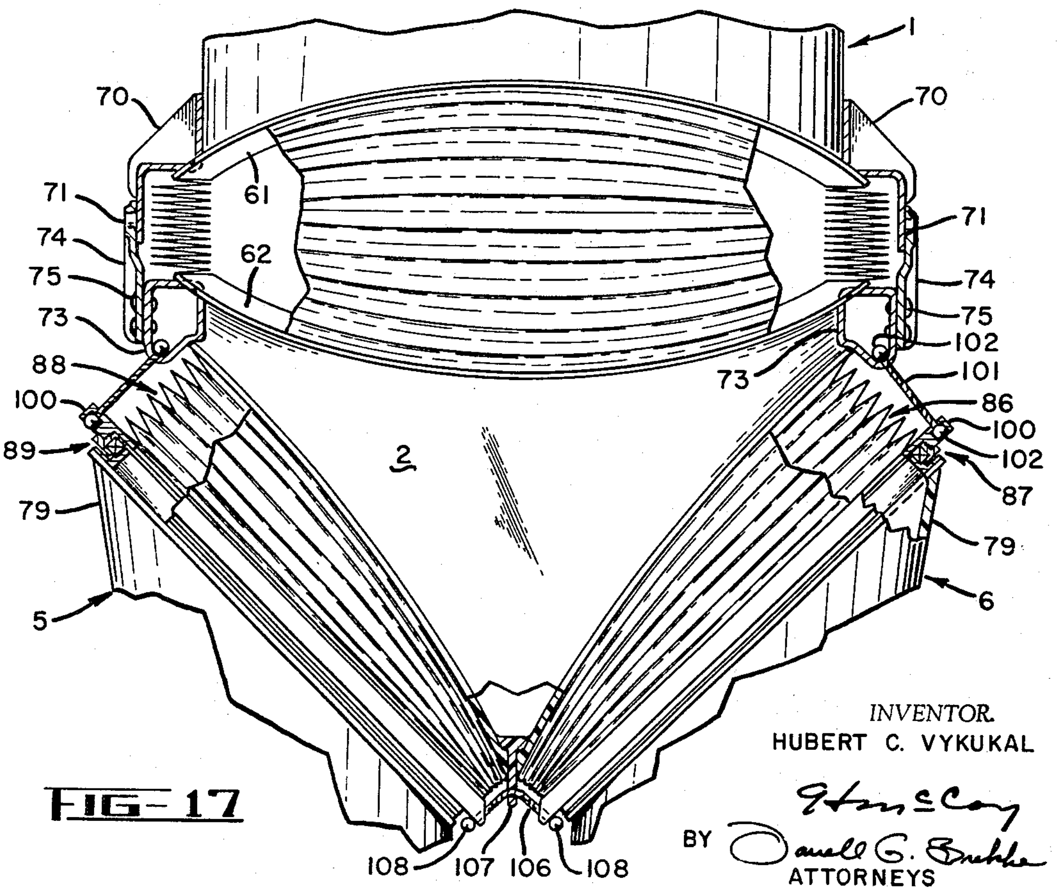
Figure 18:
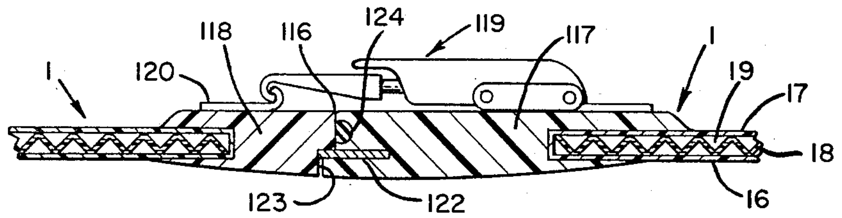
Figure 19:
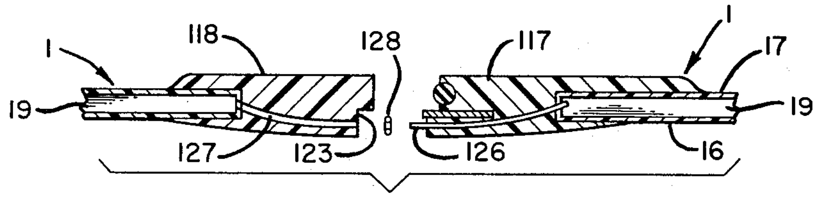
Figure 20:
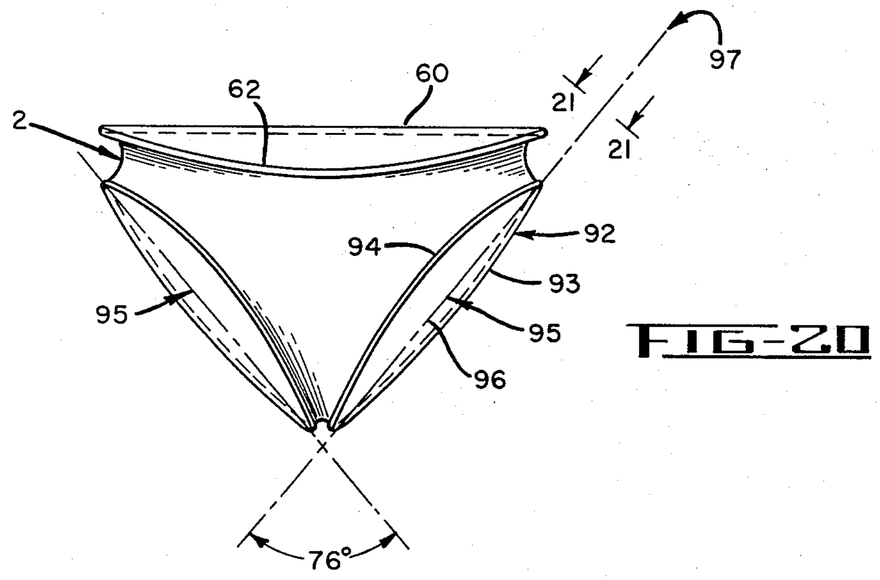
Figure 21:
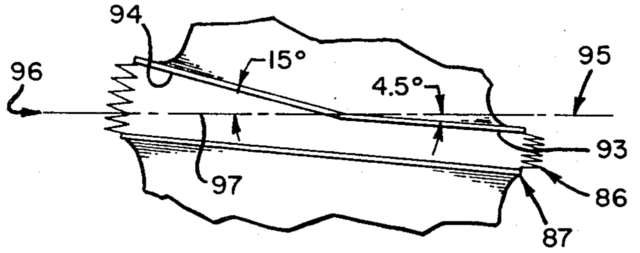

FIGURES 6 through 11 present a series of views showing the operation of the articulated joint construction employed at the elbows, which is the same type of construction employed at the knees. More specifically, FIGURES 6, 8 and 10, respectively, show the front of the joint as it appears in the straight condition of FIGURES 1 and 6, the partially bent condition of FIGURE 8, and the fully bent condition of FIGURE 10. FIGURES 7, 9 and 11 are side views of the joint in the positions shown in FIGURES 6, 8 and 10, respectively. Indexing marks have been placed on the joint segments on each side of each of the bearings to indicate the relative rotational movement of the parts;

FIGURE 12 is a perspective view on enlarged scale showing a representative cross sectional view of the construction which can be employed for all parts of the suit other than the bellows and bearings;

FIGURE 13 is an enlarged cross sectional view of a bearing and seal representative of all of the bearings and seals employed in the suit;

FIGURE 14 is an enlarged cross sectional view showing an arrangement which can be employed to conduct fluids across the various bearings and is representative of the arrangement which can be employed at all bearings;

FIGURE 15 is a cross sectional view taken on the line 15—15 of FIGURE 14;

FIGURE 16 is a side elevational view on enlarged scale showing the waist and hip portions of the suit viewed from the left as in FIGURE 2, with parts cut away to show the bellows construction and attachment;

FIGURE 17 is a view taken on the line 17—17 of FIGURE 16 and showing the waist and pelvic portions of the suit as viewed from the front with parts of the bellows cut away;

FIGURE 18 is a cross sectional view on an enlarged scale taken on the line 18—18 of FIGURE 1 and showing the latch construction at the separating line for donning and removing the suit;

FIGURE 19 is an exploded view similar to FIGURE 18 but with the latch removed and showing a different position along the separating line;

FIGURE 20 is a front elevational view of the pelvic portion on enlarged scale; and FIGURE 21 is a view along the edge of one of the leg openings in the pelvic portion of the suit as seen from line 21—21 on FIGURE 20.

Referring in more detail to the drawings and in particular to FIGURES 1 and 2, the environmental suit according to the invention comprises an upper body covering portion 1, a pelvic covering portion 2, arm covering portions 3 and 4, and leg covering portions 5 and 6. A transparent helmet 7 of a material such as plexiglass is hermetically bonded to the neck opening at the top of the body portion 1, gloves 11 and 12 are sealed to the lower ends of the arm portions, and boots 13 and 14 are sealed to the lower ends of the leg portions. The gloves and boots can be of conventional construction employing flexible materials such as cloth and leather because the surface area of these parts is small in comparison to the surface area of the total suit, so that any gas leakage through the gloves and boots is of minor concern.

In order to achieve the full objective of the invention the walls of the covering portions 1–6 are preferably made in a hard, rigid honey-comb design, as shown by the representative example in FIGURE 10. As shown in FIGURE 10, the type of wall construction which can be used for all of the covering portions 1–6 comprises inner and outer skins 16 and 17 of glass fiber cloth held in spaced relation by separating ribs 18. The ribs 18 are also formed of glass fiber cloth folded into a corrugated patern as shown. All of the glass fiber cloth portions 16–18 are first formed in the desired shape and then saturated with resin to bond them together and result in a rigid strong wall structure which is impervious to leakage of gas or liquid. In addition, the honeycomb construction results in a wall structure which has a high strength-to-weight ratio. As a result, the suit can be made comparable in weight to conventional flexible fabric suits. In addition, the ribs 18 form, together with the skins 16 and 17, a plurality of passageways 19 which can be used to channel fluids throughout the entire suit or various portions thereof. The channels can be arranged in various ways in different parts of the suit. Where it is desired to terminate the passageways 19, for example at the ends of various portions of the suit, the inner and outer walls pass continuously around the end to form an end wall 20 which closes the ends of the channels. At the end wall 20, alternate adjacent channels 19 can be connected by notched apertures 21 so that fluid flow can come down one channel and back through the adjacent channel. Conventional fluid coupling fittings (not shown) can be attached to the wall construction to receive inlet and outlet hoses to deliver fluid to one channel 19 and remove it from another channel after the fluid has coursed through the desired portion of the suit. Such fittings are preferably positioned at the back of the suit.

The described type of wall construction has been found to be extremely effective against meteorite penetration and other types of punctures. A desired temperature can be maintained in the suit by delivering temperature controlled fluids through the passages 19. When the fluid is a liquid such as water it serves the additional function of protecting against radiation. In addition, the hard, nonflexing surface of the wall construction is well adapted to have a layer of insulating material bonded thereto or to receive a coating of reflective paint.

Although the honeycomb type of structure is preferred, it should be understood that certain features of the invention can be accomplished by a solid wall structure of relatively light weight material such as resin saturated glass fiber cloth or a thin sheet of light weight metal such as aluminum. In addition, it should be understood that a mixture of wall constructions can be employed. For example, the upper body portion can be of the general type construction shown in FIGURE 12, and the remaining walls can have a single sheet construction. In order to simplify the disclosure in the drawings, and because the multilayer wall construction would not show up in small section views, the wall sections will be shown solid as if taken along one of the ribs 18, except in such views as are intended to show specific features of the fluid passageway systems, and these views will be made on sufficiently large scale to show the composite wall construction.

Figure 5:
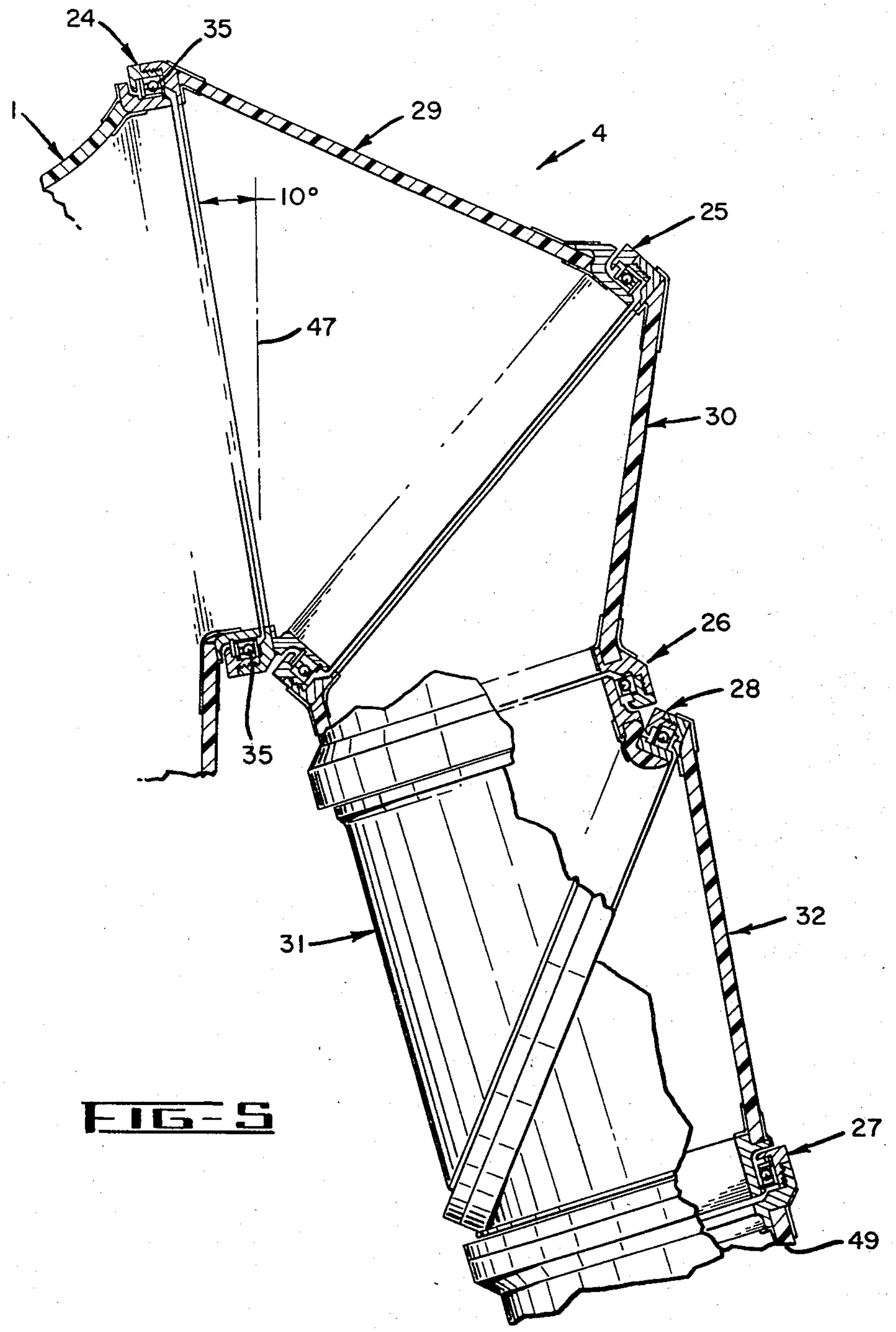
FIGURE 5 is primarily a sectional view through the shoulder bearings and the elbow bearings and showing part of the elbow joint in elevation.

As shown in FIGURES 1, 2 and 5, and particularly the latter, the articulation for each arm is accomplished in the following manner. Since the arrangement for each of the arms 3 and 4 is symmetrical, only the arrangement for arm 4 will be described in detail. The arrangement comprises a first shoulder bearing 24 which connects the arm portion 4 to the upper body portion 1, a second shoulder bearing 25, a first elbow joint bearing 26, positioned above the wearer's elbow, a second elbow bearing 27 positioned below the elbow, and an intermediate bearing 28 arranged diagonally between the bearings 26 and 27. The arm portion comprises a tubular section 29 between bearings 24 and 25, a tubular section 30 between bearings 25 and 26, a tubular section 31 between bearings 26 and 28, and a tubular section 32 between bearings 27 and 28. Each of the bearings is a circular bearing comprising an inner race, an outer race, and a plurality of balls between the races.

Since all of the bearings are similar in basic construction, only the bearing 26 will be described in detail, as shown in FIGURE 13. Bearing 26 comprises a metal outer race 33, a metal inner race 34 and a plurality of metal balls 35. The inner race 34 is held in a metal attachment ring 36 which is secured to the adjacent tubular section 31, for example by way of an epoxy bond. The inner race 34 is held against movement in one direction by a snap ring 37, and is held against movement in the other direction by an annular wiping seal member 38 made of a plastic material such as nylon or Delrin. An outer attachment ring 39 is bonded to the tubular section 30, and the outer bearing race 33 is held in ring 39 by a threaded ring 40. O-ring seals are preferably employed at 41 and 42 as shown in FIGURE 13. The threaded attachment ring 40 has bonded thereto a circular ring 43 against which the wiping seal 38 abuts to form the wiping seal line. The ring 43 is made of plastic material such as Teflon. The pressure inside the suit forces the wiping seal member 38 into firm contact with the ring 43 to maintain a good seal. The ring-shaped seal member 38 is provided with annular weakening notches 44 and 45 so that fluid pressure inside the suit (on the left of member 38 in FIGURE 13) will more easily force the seal member 38 into contact with the ring 43. It is important to note that the seal formed by the abutment of members 38 and 43 is on the outer side of the bearing balls 35 with reference to the inside and outside of the suit. In this manner the bearing races and balls are never exposed to any vacuum environment existing on the outside of the suit. This is important because in a substantial vacuum, metal parts tend to seize together where they are in contact.

Figure 3:
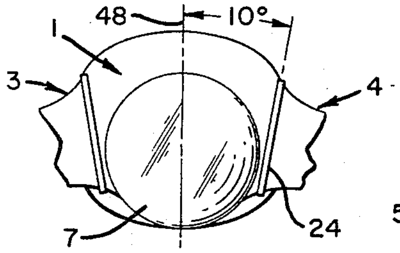
FIGURE 3 is a partial top view of the suit of FIGURE 1.

Referring again to FIGURES 1, 2 and 5, it should be pointed out that the plane of the balls 35 in bearing 24 (hereinafter called the plane of the bearing) is sloped inwardly at the top toward the vertical centerline of the suit, which centerline is coincident with the spinal centerline of the wearer. More specifically the plane of bearing 24 is preferably inclined inwardly at the top at an angle of approximately 10 degrees with respect to a line 47 (in FIGURE 5) parallel to the vertical centerline of the suit. The reason for inclining bearings 24 inwardly at the top is to make it possible for the wearer to move his hands together when his arms are raised above his head. Referring now to FIGURE 3, it will be seen that the plane of bearing 24 is also preferably inclined inwardly at the front of the suit at an angle of about 10 degrees to a line 48 (in FIGURE 3) normal to the frontal plane of the suit. The reason for inclining bearings 24 inwardly at the front is to make it possible for the wearer to move his arms across his chest. Bearing 25 makes it possible for tubular sections 29 and 30 to rotate in opposite directions so that the longer sides of sections 29 and 30 can rotate in opposite directions toward the armpit and permit outward movement of the arm.

The plane of bearing 25 is inclined clockwise in FIGURE 5 at an angle of about 50 degrees from the plane of the bearing 24. The plane of bearing 26 is inclined clockwise in FIGURE 5 from the plane of bearing 25 at an angle of about 32 degrees. It should be understood that FIGURE 5 shows the arrangement of arm 4 when the center points of all of the bearings 24–28 are arranged to lie in a common plane.

When the arm of the wearer is arranged so that the elbow is straight, the bearings 26 and 27 are substantially coaxial and substantially parallel, as shown in FIGURE 5, and the intermediate bearing 28 forms an angle of about 50 degrees with each of the bearings 26 and 27. Although the usually preferred arrangement for bearings 26 and 27 is such that they have one position (the straight elbow position shown in FIGURE 5) in which they are coaxial, the axes of bearings 26 and 27 can be offset in order to conform to the arm configuration of a particular wearer without destroying the desired action. However, in order to avoid an undesirable twisting action when the elbow is bent, it is necessary that the axes of bearings 26 and 27 be arranged substantially parallel to each other (in the straight elbow position) if the axes are offset from an exact coaxial relation. In other words it is necessary that the bearings 26 and 27 have one position (the straight elbow position) in which the planes of the bearings are substantially parallel. The torque required to bend at the elbow is decreased the more that the angle between bearing 28 and bearings 26 and 27 is increased. However the magnitude of the angle is limited by the requirement of providing a construction which will fit the normal wearer's arm. The forearm covering section below the bearing 27 is designated 49, and it is to this section that the glove 12 is sealed. It is possible that with extreme bending motions of the arm, the various arm bearings can become so oriented that they reach a dead center type of position which tends to resist return movement. Normally this resistance can be easily avoided, but, if desired, limiting stops (not shown) can be placed on opposite sides of each bearing so that the stops will abut each other before the bearing reaches a dead center type of position. It might seem that the bearing 27 is superfluous in view of the presence of bearing 26, but the direct contrary is the case as will now be described in connection with FIGURES 6–11.

FIGURES 6 and 7 show the arrangement of the elbow joint when the wearer's arm is straight, that is, when bearings 26 and 27 are substantially coaxial and substantially parallel. In order to show the movement of the various parts as the elbow joint is flexed, indexing triangles 50, 51, 52 and 53 are schematically marked on the arm portions 30, 31, 32 and 49 respectively, on opposite sides of the bearings 26 and 27. Similarly, indexing triangles 54 and 55 are marked on the arm portions 31 and 32, respectively, on opposite sides of the bearing 28. FIGURES 8 and 10 show the position of the elbow joint sections as the sections 30 and 49 are moved toward each other about the bearing 28 as in bending the elbow. In performing this bending motion, the sections 30 and 49 are held so that they will not undergo any rotational movement, but the force required to prevent the rotational movement is insignificant because of the bearings 26 and 27. It is important to note in FIGURE 8 that as the elbow joint is bent, both of the arm sections 31 and 32 rotate as is shown by the displacement of the triangles 51 and 52. The rotation of arm sections 31 and 32 becomes even more substantial the sharper the elbow is bent as shown in FIGURES 10 and 11. It will be understood from the showing of FIGURES 6–11 that if the bearing 27 were omitted, the forearm section 49 would be required to rotate with the elbow section 32, as shown by the index triangle 52, so that as the elbow is bent the wearer's forearm and hand would be forced to rotate. This rotation would occur even if the forearm covering portion 33 were soft suit material because, as previously explained, when soft suit material is inflated it becomes highly resistive to torsion.

Figure 4:
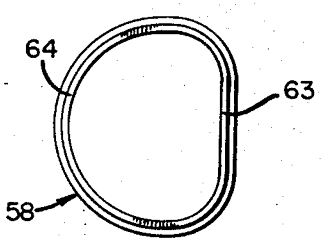
FIGURE 4 is a top plan view of the waist bellows removed from the suit.

Proceeding down the environmental suit, it will be seen that the upper body portion 1 is connected to the pelvic portion 2 by means of a metal bellows 58. Bellows 58 is sealed to the body and pelvic portions by an epoxy bond. The lower end of the body portion 1, the upper end of the pelvic portion 2, and the bellows 58 are all specially shaped so that the bellows will be more open in the front than in the rear when the wearer is standing erect as shown best in FIGURES 2 and 16. More specifically, the rear half section of the opening at the bottom of the body member 1 has a rim 59 lying in a plane which is normal to the axis of the body portion 1 and is substantially horizontal when the wearer is standing erect. Similarly, the opening in the upper end of the pelvic portion 2 is provided with a rim 60 which lies in a horizontal plane parallel to the plane of rim 59 when the wearer is standing erect. The front half section of the opening at the bottom of the body portion 1 is provided with a rim 61 lying in a flat plane. However, the plane of rim 61 is inclined upwardly with respect to the plane of rim 59 at an angle of about 24.5 degrees. The front rim section 61 of course merges with the rear rim section 59 at the sides of the suit, and the merging region is given a slight curvature as shown in FIGURE 16. Similarly, the front half section of the opening at the top of the pelvic portion 2 is provided with a rim 62 lying in a flat plane, and the plane of rim 62 is inclined downwardly at an angle of about 20.5 degrees from the plane of the rear half section 60. It will be noted that rim 61 tilts up more than rim 62 tilts down, and this is to conform the action of the suit more nearly to conventional body bending movement. As in the case of the rim sections 59 and 60, the rim sections 60 and 62 merge at the sides of the suit in a slight curvature. The opening at the upper end of the bellows 58 is provided with a rim having a rear half section 63 lying in a flat plane and a front half section 64 lying in another flat plane. Similarly, the opening at the bottom of the bellows is provided with a rear half section having a rim 65 lying in a flat plane, and a front half section having a rim 65 lying in another flat plane. The plane of bellows rim section 64 is inclined upwardly with respect to the plane of bellows section 63 at an angle of about 24.5 degrees so that the entire upper rim 63, 64 of the bellows will exactly match the contour of the entire lower rim 59, 61 on the body portion 1. Similarly, the front half rim section 66 on the bellows is inclined downwardly at an angle of about 20.5 degrees with respect to the plane of the rear half rim section 65 so that the entire lower rim 65, 66 of the bellows will exactly match the contour of the upper rim 60, 62 of the pelvic portion 2. The metal bellows 58 is preformed and heat treated to have its described shape in a relaxed condition before it is attached to the body portion 1 and pelvic portion 2. Thus, when the bellows is placed in the suit there is no stress in the bellows tending to tilt the body portion forward or backward. The reason for the special shape of the bellows is to reduce the resistance of the bellows to forward bending movement of the body portion 1 with respect to the pelvic portion 2. The human body is designed to bend forward at substantial angles, but body design and normal body movements do not involve any appreciable rearward bending at the waist. Thus the special shape of the bellows 58 is designed to reduce resistance of the bellows to forward bending. The reason the bellows shape accomplishes its purpose is that when the convolutions of a bellows are substantially spread, as in the front of bellows 58, they are more easily compressed together than where the convolutions are already close together as at the rear of the bellows. Similarly where the convolutions of the bellows are folded closely together, as at the rear of the bellows 58, it is easier to expand the convolutions than if they are already expanded as at the front of the bellows. Thus, the bellows shape is optimized to reduce bellows resistance to forward bending. In order that the bellows 58 and the adjacent suit portions 1 and 2 will conform better to the body cross section of the usual wearer, the bellows is wider from side-to-side as shown in FIGURE 4, instead of being exactly circular.

In order to restrain the bellows against undesirable expansion due to pressure inside the suit, a pivot bearing arrangement is provided across the bellows on each side of the suit. More specifically, as shown in FIGURES 16 and 17, a metal bracket 70 is attached to each side of body portion 1, as for example by an epoxy glue bond. Each of the brackets 70 is provided with a short outwardly extending trunnion 71. A cooperating two-piece bracket structure is attached to each side of the pelvic portion 2. The two-piece bracket structure comprises a first tubular-shaped piece 73 which is bonded directly to the pelvic portion, as by means of an epoxy glue bond. The second part of the two-piece structure comprises a plate 74 having a bore in its upper end which has a rotational bearing fit around trunnion 71. The bracket member 74 is attached to the member 73 by means of screws 75. Thus, the trunnion 71 on bracket 70, in cooperation with the bore in bracket 74 forms a pivot axis between the body portion 1 and the pelvic portion 2 on each side of the suit. It will be understood of course that these pivot axes on opposite sides of the suit are coaxial. The location of the pivot axis formed by the bearing trunnions 71 is located between the front and rear of the bellows at a location which will cause the suit to have an erect position when the interior of the suit is pressurized.

The construction of the leg covering portions 5 and 6, and their connections to the pelvic portion 2, will now be described. Since the legs 5 and 6 are both constructed in the same manner, only leg 6 will be described in detail. Leg 6 comprises circular bearings 76, 77 and 78 for the knee joint. The bearings 76, 77 and 78 are exactly the same in function as was described in detail for the elbow bearings 26, 27 and 28, respectively. In other words the bearings 76 and 77 are substantially parallel and preferably substantially coaxial when the wearer's knee is straight, and the bearing 78 extends diagonally between the bearings 76 and 77. The leg 6 has an upper tubular thigh section 79 which is connected to one side of bearing 76. The bearings 76 and 78 are interconnected by a knee section 81, and the bearings 77 and 78 are interconnected by a knee section 82. The leg 6 has a lower section 83 which is connected at its upper end to the bearing 77 and at its lower end is sealed to the boot 14. The knee construction functions in the same manner as described for the elbow construction in FIGURES 6–11.

The upper end of each leg is connected to the pelvic portion 2 by the combination of a bellows and a circular bearing. As shown in FIGURES 1, 2 and 16, the leg 6 is connected to the pelvic portion 2 by a metal bellows 86 and a circular bearing 87. Similarly, the leg 5 is connected to the pelvic portion by a metal bellows 88 and a circular bearing 89. The combination of bearings 87, 89 and bellows 86, 88 is essential for proper movement of the wearer's leg with respect to his torso. For example, when the wearer moves to a sitting position with his thigh covering portions 79 at approximately 90 degrees to his body covering portion 1, the bearings 87 and 89 permit this upward movement of the thighs. However, at the same time the angular position of the bearings 87 and 89 will cause the thigh portions 79 to move outwardly in a spread-leg fashion. In order to compensate for this action, the bellows 86 and 88 permit the legs to be brought into normal forward position by compressing the frontal sections of the bellows. The same type of cooperation between the thigh bellows and bearings occurs when the wearer bends over to pick up an object, and is also involved to a lesser extent when the wearer moves his thighs forward in a walking motion. Since most of the compression of the bellows occurs at the front of the bellows, the convolutions at the front of the bellows are more widely spread than at the rear of the bellows for the reasons explained in connection with the waist bellows 58.

In order to obtain the desired leg motions at the pelvic joint area, the rims of the leg openings in the pelvic portion and the rims at the ends of the bellows all have special shapes as will now be described with particular reference to FIGURES 20 and 21. FIGURE 20 shows the pelvic portion 2 arranged so that it faces exactly forward with reference with the plane of the paper. Since the leg openings are the same on each side of the pelvic portion only the leg opening on the right side as viewed in FIGURE 20 will be described in detail. The leg opening on the right in FIGURE 20 is provided with a continuous rim 92 which has a planar rear half section 93 and a planar forward half section 94. The forward and rearward half sections intersect at the extreme top and bottom of the continuous rim 92. The dot-dash line 95 on each side of FIGURE 20 represents the front edge of a plane normal to the paper and passing through the upper and lower points where rim sections 93 and 94 intersect. The planes 95 intersect at an angle of about 76 degrees. FIGURE 21 is a view taken along the line 21—21 of FIGURE 20 wherein the line 21—21 is normal to the plane 95. In order to more easily orient the relation between FIGURES 20 and 21, the front edge of the plane is designated 96 and the top edge of the plane is designated 97. As shown in FIGURES 20 and 21 the rear half section rim 93 is inclined slightly downwardly and outwardly with respect to plane 95 at an angle of about 4.5 degrees, and the front half section rim 94 is inclined upwardly and inwardly at an angle about 15 degrees with respect to the plane 95. In other words the plane of the front half rim section 94 is inclined at an angle of about 10.5 degrees with respect to the plane of the rear half rim section 93. Thus, the rim 92 is formed into sections which are inclined to each other to provide the greater spacing of the bellows convolutions in the front than in the rear. In addition, the entire rim 92 is inclined slightly forwardly in order to conform the operation of the thigh bellows and bearing most nearly with the complex operation of the pelvic joint.

In order to restrain the bellows 86 and 88 against undesired expansion due to the pressure inside the suit, the tops and bottoms of bearings 87 and 89 are connected to the bracket 73 on the pelvic portion by tension members which will not elongate but will bend. By way of example, the tension members can be made of metal cable which is used in aircraft control systems. More specifically, as shown in FIGURES 16 and 17, the upper race of the bearings 87 and 89 carry an attachment ring 100 having a bore therethrough at the top and at the bottom. In like manner each of the brackets 73 on the pelvic portion is provided with a bore. A length of aircraft cable 101 is threaded through the bores in the members 73 and 100, and then holding beads 102 are secured to the ends of the cable to prevent the cable from passing back out through the bores, which of course are smaller in diameter than the holding beads. Similarly, a length of metal cable 106 is threaded through the lower bores in the rings 100 and slidingly through a bore in a downwardly depending bracket 107 which is connected to the pelvic portion 2. Holding beads 108 are then attached to cable 106. It will be noted that the lengths of cables 101 and 106 are so selected that the bellows are more compressed at their lower ends than at their upper ends. The reason is to reduce the width in the crotch area so that no chaffing will occur on the inside of the wearer's legs. Also, the longer length of the top cable 101 allows a larger angular change of the thigh section 79 when sitting or bending over. The metal bellows 86 and 88 are preformed so that their relaxed shape prior to insertion in the suit is in fact the shape which the bellows have after insertion in the suit in the erect suit position shown in the drawings. It will be understood that if the cable 106 were rigidly connected to the pelvic bracket 107, it would be extremely difficult for the wearer of the suit to bend sideways.

FIGURES 14 and 15 provide a representative showing of an arrangement for connecting fluid passageways 19 across bearings, as for example, the bearing 76. The arrangement comprises an elbow tube 110 connected to each of the passageways 19 on opposite sides of the bearing. An elongated flexible transfer tube 111 is connected to the elbow tubes on opposite sides of the bearing and is arranged in a loop lying adjacent and bending around the inside of one side of the tubular body covering. The tube 111 is forced to stay in the described position by means of a pair of shield cylinders 112 and 113 which are bonded to the inner skin 16 of the adjacent covering wall. It should be understood, as indicated in FIGURE 14, that the elongated tube 111 runs along the outside of shield 112 on one side of the shield and back up along the outside of the same side of shield 113. In other words the tube 111 does not pass downwardly along one side of one of the shields, around the bottoms of the shields and up along the other side of the second shield. The latter arrangement would result in the tube 111 being pulled taught as the opposite sides of the bearing were turned relative to each other in one direction, and would result in excessive looseness of the tube if the bearing sides were turned in the opposite direction. In contrast, the arrangement shown in the drawings permits the opposite sides of the bearing to turn in either direction, and regardless of direction, the bottom loop of the tube 111 merely shifts upwardly as the opposite sides of the bearing are turned. It will be apparent as shown in FIGURES 14 and 15 that additional transfer tubes can be employed, and one such additional tube 114 is shown. As shown in FIGURE 15 the required number of transfer tubes can be reduced by interconnecting a plurality of passageways 19 for communication with a single tube, as for example the three passageways 19 shown at the center of FIGURE 15.

In order to permit the wearer to don and remove the suit, the upper body portion 1 is made in two sections joined together on a continuous joint line 116 which passes across the front of the body portion, over the right shoulder across the back of the body portion and around the left waist. FIGURES 18 and 19 show representative cross sections through the joint 116. FIGURE 18 shows the arrangement where there is no need to carry fluid passageways across the joint line, and FIGURE 19 shows the arrangement where the passageways are carried across the joint line. As shown in both of the figures, the edges of the honeycomb type wall construction are provided with edge strips 117 and 118 which can be made of glass fiber material saturated with resin to form solid rigid edge strips. As shown in FIGURE 18, a toggle latch 119 is secured to strip 117, and a cooperating hook 120 is attached to strip 118. The latching means are positioned on the outside of body portion 1 at spaced locations along the joint line 116. In order to reinforce the joint, a metal strip 122 is bonded to edge strip 117 and seats in a notch 123 in strip 118. The joint is sealed by an O-ring 124 bonded to strip 117 and compressed against strip 118 when the latch 119 is closed. The arrangement in FIGURE 18 is representative of a position along the joint where it is not intended to carry the fluid passageways 19 across the joint. FIGURE 19 shows the construction employed where it is desired to carry the fluid passageways 19 across the joint. As shown in FIGURE 19, a hollow tube 126 is bonded in edge strip 117 and opens into one of the passageways 19. The edge strip 118 is provided with a bore 127 which receives the end of tube 126 with a snug sliding fit. In order to assure a leak-tight connection, a small O-ring 128 is placed over the protruding end of tube 126.

Although specific details of the present invention are shown and described herein, it is to be understood that modifications may be made therein without departing from the spirit and scope of the invention as set forth in the appended claims.

What is claimed is:

1. An articulated hard suit comprising an upper body covering portion of rigid material, a pelvic covering portion of rigid material, a circular waist bellows interconnecting said upper body portion and said pelvic portion, articulated arm covering portions made of rigid material and connected to said upper body portion, articulated leg covering portions made of rigid material, two thigh bellows connecting said pelvic portion to said leg portions, said upper body portion having a rim forming an opening at its lower end and said pelvic portion having a rim forming opening at its upper end, the rim of said opening at the lower end of the upper body portion slopes upwardly at the front, the rim of said opening at the upper end of the pelvic portion slopes downwardly at the front, said waist bellows having a shape, when the suit wearer is erect, in which it is spread wider around one section than it is around the diametrically opposite section, and said wider spread section of the bellows is connected to said sloped rim portions of said upper body portion and said pelvic portion.

2. An articulated hard suit comprising an upper body covering portion of rigid material, a waist bellows interconnecting said upper body portion and said pelvic portion, articulated arm covering portions made of rigid material and connected to said upper body portion, articulated leg covering portions made of rigid material, two thigh bellows connecting said pelvic portion to said leg portions, each of said arm portions having a first shoulder joint bearing connecting each arm portion to said upper body portion, a second shoulder joint bearing along said arm portion beyond said first shoulder bearing and at an acute angle thereto, a first elbow joint bearing beyond said second shoulder bearing and at an angle thereto, a second elbow joint bearing spaced beyond said first elbow bearing, a third elbow joint bearing positioned intermediate said first and second elbow joint bearings, said elbow bearings being arranged so that when the elbow joint is positioned substantially straight, the planes of said first and second elbow bearings are substantially parallel, and when the planes of said first and second elbow bearings are substantially parallel to each other, the plane of said third elbow bearing is diagonal to the planes of said first and second elbow bearings.

3. An articulated hard suit comprising an upper body covering portion of rigid material, a pelvic covering portion of rigid material, a waist bellows interconnecting said upper body portion and said pelvic portion, articulated arm covering portions made of rigid material and connected to said upper body portion, articulated leg covering portions made of rigid material, two thigh bellows connecting said pelvic portion to said leg portions, at least a portion of said rigid material of said upper body portion having a rigid inner skin and a rigid outer skin, a plurality of rigid separating ribs separating said inner and outer skins and bonded thereto, said ribs being spaced from each other to form with said inner and outer skins fluid passageways in said body portion, said body portion being in two pieces separable along a joint line, an edge strip along each of said two pieces at the joint line, bores in each of said edge strips connecting said passageways to the joint face of each edge strip, connecting tubes secured in said bores in one edge strip and having a sliding fit in the bores of the other edge strip, and releasable means for holding said edge strips in abutting closed position.

4. An environmental suit having an upper body covering portion and a pelvic covering portion, said body portion having a body opening at the bottom thereof surrounded by a rigid rim, said pelvic portion having an upper body opening therein surrounded by a rigid rim, a circular bellows interconnecting said rims, and said rims being spaced farther apart at the front of said suit than at the back of said suit when a wearer of the suit stands erect.

5. An environmental suit as claimed in claim 4 further comprising pivot means interconnecting each side of said body portion and pelvic portions and preventing said bellows from expanding at the side, and the pivot axes of said pivot means being coaxial on an axis extending from side to side of said body portion.

6. An environmental suit having a pelvic portion with two lower circular rims, the rims forming leg openings, said leg opening rims being closest together at the bottom and sloping upwardly and outwardly therefrom, the front section of each of said rims lying in a first plane and the rear section of each of said rims lying in a second plane, said first plane being inclined upwardly and inwardly with respect to the front of said pelvic portion and with respect to said second plane, a thigh bellows connected to each of said rims, each of said thigh bellows having a rim at one end thereof having inclined sections matching the inclined sections of the rim of its respective leg opening, two leg covering portions, and each of said leg covering portions being attached to the lower end of one of said thigh bellows.

7. An environmental suit as claimed in claim 6 further comprising a non-stretchable cable connecting the outside of the upper end of each leg portion to the adjacent side of said pelvic portion, and a bottom non-stretchable cable interconnecting the inner sides of the upper ends of said leg portion, and said bottom cable having a sliding fit through a bore in the bottom of said pelvic portion intermediate the lower ends of said bellows.

8. An environmental suit as claimed in claim 7 in which the lengths of said cables are such that said bellows are expanded more at their upper edges than at their lower edges when said leg portions extend straight down from said pelvic portion.

9. An environmental suit comprising a body covering portion and two arm covering portions, each of said arm portions having a first shoulder joint circular bearing connecting the arm portion to the body portion, a second shoulder joint circular bearing along said arm portion beyond said first shoulder bearing and at an angle thereto, a first elbow joint circular bearing positioned beyond said second shoulder bearing and at an angle thereto, a second elbow joint circular bearing spaced beyond said first elbow bearing, a third elbow joint circular bearing positioned intermediate said first and second elbow joint bearing, said elbow bearings being arranged so that when said arm portion is positioned substantially straight said first and second elbow bearings are parallel, and when said first and second elbow bearings are substantially parallel to each other said third elbow bearing is diagonal to said first and second elbow bearings.

10. An environmental suit having an upper body portion comprising a rigid inner skin and a rigid outer skin, a plurality of rigid separating ribs separating said inner and outer skins and bonded thereto, said ribs being spaced from each other to form with said inner and outer skins a fluid passageway in said suit, said body portion being in two pieces separable along a joint line, and edge strip along each of said two pieces at the joint line, a bore in each of said edge strips connecting said passageway to the joint face of each edge strip, a connectting tube secured in said bore in one edge strip and having a sliding fit in the bore of the other edge strip, and releasable means for holding said edge strips in a abutting closed position.

11. An articulated hard suit comprising an upper body covering portion of rigid material, a pelvic covering portion of rigid material, a waist bellows interconnecting said upper body porton and said pelvic portion, articulated arm covering portions made of rigid material and connected to said upper body portion, articulated leg covering portions made of rigid material, two thigh bellows connecting said pelvic portion to said leg portions, said pelvic portion having three rims forming an upper body opening and two leg openings, the rims of said leg openings sloping upwardly and outwardly toward the rim of said body opening whereby said pelvic portion is substantially triangular in front elevation, the front half section of each of said leg rims lying in a first plane and the rear half section of each leg rim lying in a second plane, said first plane being inclined upwardly and inwardly with respect to said second plane, and each of said thigh bellows having a rim at one end which has inclined half sections matching the inclined half sections of its respective leg rim on said pelvic portion.

12. An articulated hard suit comprising an upper body covering portion of rigid material, a pelvic portion of rigid material, a waste bellows interconneting said upper body portion and said pelvic portion, articulated arm covering portions made of rigid material and connected to said upper body portion, each of said arm portions having a shoulder joint bearing connecting each arm portion to said upper body portion, said shoulder bearings being inclined toward each other so they are closer together at their upper edges, articulated leg covering portions made of rigid material, and two thigh bellows connecting said pelvic portion to said leg portions.

13. An articulated hard suit comprising an upper body covering portion of rigid material, a pelvic portion of rigid material, a waist bellows interconnecting said upper body portion and said pelvic portion, articulated arm covering portions made of rigid material and connected to said upper body portion, each of said arm portions having a shoulder joint bearing connecting each arm portion to said upper body portion, said shoulder bearing being inclined toward each other so they are closer together at their upper edges and at their forward edges, articulated leg covering portions made of rigid material, and two thigh bellows connecting said pelvic portion to said leg portions.

14. An environmental suit comprising an upper body covering portion and two arm covering portions, each of said arm portions having a shoulder joint circular bearing connecting each arm portion to said body portion, and said shoulder bearings being doubly inclined toward each other so they are closer together at their forward edges than their rear edges and closer together at their upper edges than their lower edges.

15. An environmental suit comprising a tubular portion, a circular bearing interconnecting adjacent sections of said tubular portion, said adjacent portions each having a fluid flow passageway therein, an elongated flexible tube connected to said passageways and extending across said bearing, two cylindrical shields positioned end-to-end inside said tubular sections on opposite sides of said bearing, said cylindrical shields being spaced inwardly from the inside wall of said tubular sections to provide a running space for said flexible tube, said flexible tube being positioned in an elongated U-shape between said shields and said tubular sections, said U-shaped tube having one end connected to one of said tubular sections and extending along the outside of one of said cylindrical shields on one side of the axis of said tubular portion, and the other end of said U-shaped tube being connected to the other of said adjacent tubular sections and extending along the outside of the other of said shields on said one side of said axis.

16. An environmental suit having a greater internal gas pressure than external gas pressure and a tubular portion to receive a part of the wearer's body, a circular bearing interconnecting adjacent portions of said tubular portion, said bearing comprising a plurality of balls engaged between an outer circular race and an inner circular race, first and second rings, said outer and inner races being connected to said adjacent portions, respectively, by said first and second rings, respectively, said inner race being nearer said wearer than said outer race, a plastic ring fastened to said first ring, a plastic annular wiping seal fastened to said second ring and in peripheral contact with said plastic ring, said internal pressure forcing said wiping seal against said plastic ring, and said bearing being on the high pressure side of said wiping seal and said ring to avoid seizing when said suit is used in a vacuum environment.

References Cited

UNITED STATES PATENTS

| | | | |
|---|---|---|---|
| 237,141 | 2/1881 | Tasker | 2—2.1 |
| 1,146,781 | 7/1915 | Bowdoin | 2—2.1 |
| 1,760,512 | 5/1930 | McBride | 128—142.5 |
| 2,034,637 | 3/1936 | Mooney | 2—2.1 |
| 2,939,148 | 7/1960 | Hart et al. | 2—2.1 |
| 3,112,130 | 11/1963 | Miller | 2—2.1 X |
| 3,293,659 | 12/1966 | Shepard | 128—142.7 X |

RICHARD J. SCANLAN, Jr., *Primary Examiner.*